US007099369B2

(12) United States Patent
Karlsson

(10) Patent No.: US 7,099,369 B2
(45) Date of Patent: Aug. 29, 2006

(54) METHOD AND APPARATUS FOR SURGICAL HIGH SPEED FOLLOWER JAMMING BASED ON SELECTABLE TARGET DIRECTION

(75) Inventor: Lars Karlsson, Santa Clara, CA (US)

(73) Assignee: Networkfab Corporation, Santa Clara, CA (US)

( * ) Notice: Subject to any disclaimer, the term of this patent is extended or adjusted under 35 U.S.C. 154(b) by 0 days.

(21) Appl. No.: 11/201,413

(22) Filed: Aug. 10, 2005

(65) Prior Publication Data

US 2006/0153280 A1 Jul. 13, 2006

Related U.S. Application Data

(63) Continuation-in-part of application No. 10/912,976, filed on Aug. 6, 2004.

(60) Provisional application No. 60/600,645, filed on Aug. 11, 2004.

(51) Int. Cl.
*H04B 1/69* (2006.01)
*H04K 3/00* (2006.01)

(52) U.S. Cl. .............................. 375/130; 455/1; 342/14

(58) Field of Classification Search ........ 375/130–135, 375/138, 139, 141, 144–146, 260, 262, 344, 375/346, 350; 455/1; 342/14, 17; 398/391
See application file for complete search history.

(56) References Cited

U.S. PATENT DOCUMENTS 6,036,351 A * 3/2000 Wagstaff ..................... 708/321
6,335,953 B1 * 1/2002 Sanderford et al. .......... 375/344
2002/0051498 A1 * 5/2002 Thomas et al. ............. 375/262
2003/0103589 A1 * 6/2003 Nohara et al. .............. 375/350
2004/0042568 A1 * 3/2004 Rowitch ..................... 375/346
2004/0243258 A1 * 12/2004 Shattil ......................... 700/73

* cited by examiner

*Primary Examiner*—Don N. Vo
(74) *Attorney, Agent, or Firm*—Steins & Associates, P.C.

(57) ABSTRACT

A Method and Apparatus for Surgical High-speed Follower Jamming Based on Selectable Target Direction is disclosed. The system and method of the present invention automatically detects and jams sudden, short duration communications signals in near real time, in a compass direction selected by the user on the battlefield. Such a system is unique in the number and type of input parameters it uses to allow the operator to tailor its jamming results. The system solves the efficiency, fratricide, and latency issues of prior art systems and greatly enhances the operational capabilities of the modern military unit by allowing the unit to kill all enemy transmitters in any specified sector of the battlefield. The system embodies the addition of real time direction-finding methods to the invention of application Ser. No. 10/912,976. The system has all the abilities of the system described in the '976 application, but is further able to automatically detect the direction of the incoming signals (relative to the user), and thereafter to add that information to the jamming decision logic. Finally, the preferred system provides a user interface that enables operators to set up the system to jam on enemy signals based upon the direction to those enemy signals.

18 Claims, 4 Drawing Sheets

FIGURE 1 - PRIOR ART

FIGURE 2 - PRIOR ART

The Effects of Follower Jamming on the RF Spectrum

The Effects of Surgical Follower Jamming, with Directional Capabilities, on the RF Spectrum

METHOD AND APPARATUS FOR SURGICAL HIGH SPEED FOLLOWER JAMMING BASED ON SELECTABLE TARGET DIRECTION

This application is a continuation-in-part of application Ser. No. 10/912,976, filed Aug. 6, 2004, now pending.

This application is filed within one year of, and claims priority to Provisional Application Ser. No. 60/600,645, filed Aug. 11, 2004.

BACKGROUND OF THE INVENTION

1. Field of the Invention

This invention relates to advanced military grade communications jamming systems and, more specifically, to a Method and Apparatus for Surgical High Speed Follower Jamming Based on Selectable Target Direction.

2. Description of Related Art

Modern military grade communication systems today employ short, burst type transmissions that constantly cycle through a secret sequence of frequencies in order to prevent detection and jamming. Such systems are commonly known as frequency hoppers. Typically, these systems (both foreign and domestic) only transmit on a particular frequency for no more than a few milliseconds at the most. This creates a problem for those who want to detect and jam such transmissions as they happen so quickly.

The continuing development of modern military frequency-hopping systems magnifies the complexities of electronic warfare. Today's frequency-hopping technology is advancing quickly, allowing frequency-hopping communication nets to use many frequencies (hop sets), much faster than ever before (hop speeds). A fundamental change in RF detection and jamming efficiency is needed for the modern military force to achieve and maintain electronic warfare dominance in the theater of war. The modern military force needs the capability to detect and combat any and all enemy communications in a specified sector of the battlefield, no matter how fast they hop frequencies to attempt to avoid detection.

Practically, it is not feasible to simply "splash" the radio frequency spectrum with random noise in order to jam such transmissions. The reasons are that it requires an unpractical amount of power to apply sufficient RF energy to wash out all transmissions. In addition, there may be friendly transmissions that should not be jammed. Also, since the duration of the target transmissions is so short, it is not practical to have (for instance) a CPU that is programmed to evaluate signals, make a determination, and then command transmitters to jam. There is simply not enough time to engage the frequency hopping signals before they have moved on to a new frequency.

Jamming systems attempt to solve the short cycle problem in one of three ways:

1. Barrage jamming: This type of jamming involves "splashing" a segment of the radio frequency (RF) spectrum with random or distributed noise in order to jam frequency-hopping transmissions by brute force. Barrage jamming is impractical for several reasons, including the amount of power needed to apply sufficient RF energy to wash out all transmissions. This is extremely inefficient, since jamming energy is often applied to areas of the RF spectrum where there is no enemy communications traffic, thus the energy is wasted. Also, fratricide of friendly transmissions that are near to the enemy communications is another problem of barrage jamming.

2. Follower jamming: this type of jamming, also called "fast-reaction" jamming, requires the reception of signals and the automatic selective jamming of those signals soon thereafter for as long as the enemy transmission is active. Follower jamming also has the drawback that any and all signals detected within its dynamic range will be jammed, regardless of whether it is emanating from a friend or from an enemy. The follower jammer keys off of the simple presence of signal energy at a particular frequency; there is no discrimination between friend and enemy. Thus, there are fratricide issues and inefficiency issues with wasting jammer signal energy on friendly communications.
3. Surgical follower jamming: Surgical follower jamming that is afforded by this invention is the only practical jamming method known to date for effectively jamming enemy fast frequency-hopping transmissions and preventing fratricide. Prior to the present invention, however, no follower jammer was responsive and/or had surgical accuracy adequate to truly defeat frequency-hopping transmitters.

The prior-art of FIG. 1 shows the effect of a present-day barrage jamming system. It is a drawing of several plots of RF power at a certain frequency range. Each plot depicts the same power and frequency ranges, but at different instants in time. The time order of the plots is as follows: 1, 1+x, 2, 2+x, 3, 3+x; x being the reaction time of the barrage jammer (assumed to be much smaller than one time unit). Thus the top row of plots shows the spectrum while the jammer is in the "look-through" state, while the bottom row shows the spectrum while the jammer is in the matching "attack" state.

As depicted in the upper set of graphs, an enemy signal transmission is detected at a frequency very close to a friend. As T=1 moves to T=2 and T=3, the enemy transmission frequency is "hopping" to the left and right (up and down in frequency) as compared to the friendly transmitter.

The lower set of graphs depicts the operation of a Barrage jammer. Barrage jammers essentially choose a band or segment of frequency on which to transmit the jamming signal. During the barrage jammer's attack phase, a segment of the RF spectrum is "splashed" with noise in an attempt to disrupt enemy transmissions in that segment of the spectrum. Periodically, the jammer stops jamming to see if any signals are still present in the frequency segment being focused upon. Such an operation is called a "look-through" and is necessary in case the target transmissions have moved to a new segment of the spectrum.

Such a traditional setup is suitable for the jamming of relatively long duration communication signals such as voice or a low speed data links. But this simple system has several drawbacks including the fact that a massive amount of RF power is necessary to splash any sufficiently wide segment of the RF spectrum. As the figure shows, an overwhelming percentage of this power is wasted. Another drawback is that any friendly transmissions in the segment of focus will also be jammed. A third drawback is that the power of the jamming signals is usually lower than the target signal, so that the target signal may not actually be disrupted at all.

The prior-art of FIG. 2 shows the effect of a present-day follower jamming system. This system solves the power issues of the barrage jamming system, but it has its own drawbacks. The main drawback of the follower jamming system is the fratricide problem pictured here. Since the follower jammer does not discriminate between friendly and enemy transmissions in a particular frequency segment, it will transmit jamming signals on any frequency in the segment of interest where a transmission is detected, whether friend or enemy. As a result, while the follower jammer is jamming enemy communications, friendly communications are also jammed, just like the barrage jamming system.

What is needed therefore in order to feasibly detect and jam modern fast-hopping transmissions as efficiently as possible is a System that has not only has: 1) The near-real time ability to jam detected signals, but also 2) The ability to identify the specific compass direction, or sector, of the source of the frequency-hopping transmissions, also in near real time. The user of such a system could then surgically jam enemy transmissions simply by specifying the compass sector of the enemy transmission source to be jammed. The direction of the enemy transmitters is usually known; many current and possible theaters of war are in littoral (coastal) terrain, where the direction of enemy transmitters is trivially known.

SUMMARY OF THE INVENTION

In light of the aforementioned problems associated with the prior devices and methods used by today's military organizations, it is an object of the present invention to provide a Method and Apparatus for Surgical High-speed Follower Jamming Based on Selectable Target Direction.

It is an object of the present invention to provide a method to automatically detect and jam sudden, short duration communications signals in near real time, from any selectable direction from the user on the battlefield. Such a system is unique in the number and type of input parameters it uses to allow the operator to tailor its jamming results. Such a system solves the efficiency, fratricide, and latency issues of prior art systems. Such a system greatly enhances the operational capabilities of the modern military unit, by allowing the unit to kill all enemy transmitters in any specified sector of the battlefield. The system should embody the addition of real time direction-finding methods to the invention of application Ser. No. 10/912,976

The preferred system should first have all the abilities of the system described by the previous patent application. Secondly the preferred system should be able to automatically detect the direction of the incoming signals (relative to the user), to add that information to the jamming decision logic. Finally, the preferred system should provide a user interface so that operators can set up the system to jam on enemy signals based upon their direction, thereby enhancing efficiency.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and Apparatus for Surgical High-speed Follower Jamming Based on Selectable Target Direction.

This invention of this patent application creates surgical follower jamming that is efficient and precise. It does so by employing a unique process that includes the addition of an internal direction-finding capability during normal operations. This invention thus focuses the jamming system on certain, specified compass sectors during its operation. Even less power may be needed during jamming operations due to the fact that only enemy signals coming from pre-defined directions will be jammed. This critical discrimination feature greatly enhances modern military jamming operations and capabilities.

Figure 1:
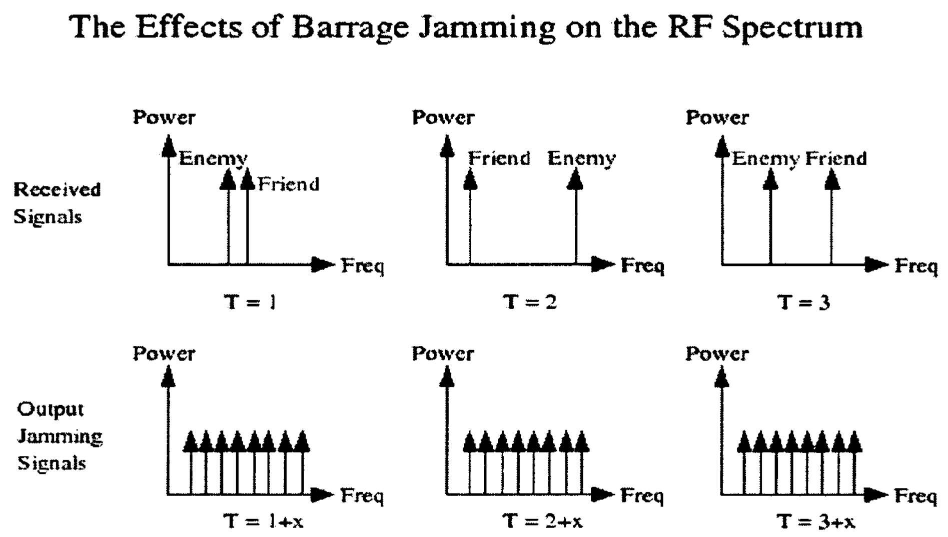
FIG. 1 is a graphical depiction of the effect of barrage jamming on the RF spectrum.
Figure 2:
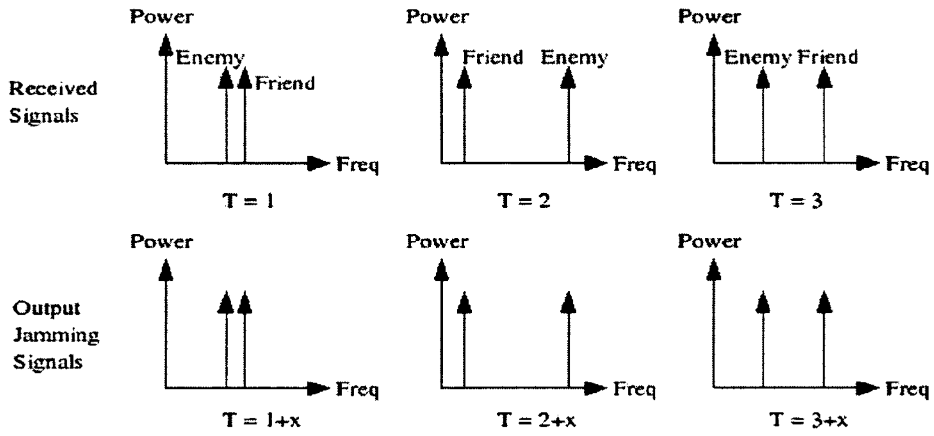
FIG. 2 is a graphical depiction of the effect of follower jamming on the RF spectrum.
Figure 3:
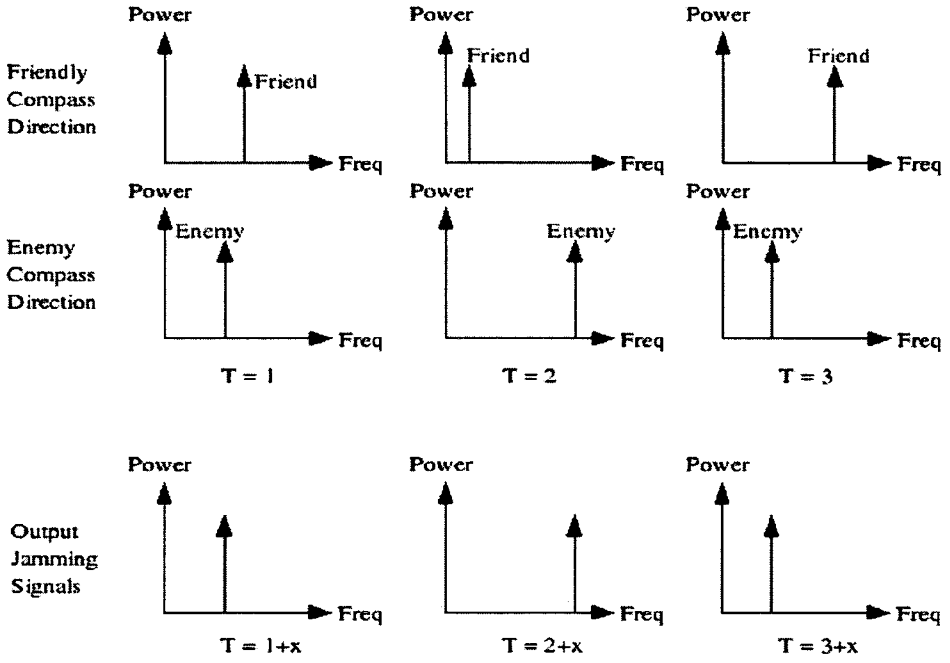
FIG. 3 is a graphical depiction of the effect of the surgical follower jamming of the present invention on the RF spectrum.

The present invention can best be understood by initial consideration of FIG. 3. FIG. 3 shows the effects of surgical follower jamming, with direction capabilities, on the RF spectrum. The friendly and enemy transmissions depicted here are identical to those depicted in the graphs of FIG. 2, except that the friendly and enemy transmissions have been plotted on separate series' of graphs to indicate that the two transmission sources are on different compass bearings from one another (relative to the jamming system).

The upper series of graphs depicts the friendly transmitter transmissions from T=1 to T=3 with its transmission frequency changing in each time period. The middle series of graphs depicts the enemy transmitter transmissions from T=1 to T=3, with the frequency of its transmission changing in each time period. One should note that while each of the transmitters' compass bearing from the jamming platform could be changing (while their transmission frequency is also hopping) the jamming system should still be able to selectively jam the enemy on its frequency and compass bearing because the compass direction rarely changes very rapidly due to the distances involved, and once identified by its transmission signature, even inexplicably rapid bearing changes can be resolved correctly.

The correct carrier is identified by compass direction and subsequently effectively jammed. The capabilities of this invention thus solve the fratricide problem mentioned above by discriminating signals by direction, while retaining the power efficiency of the standard follower jamming system.

Figure 4:
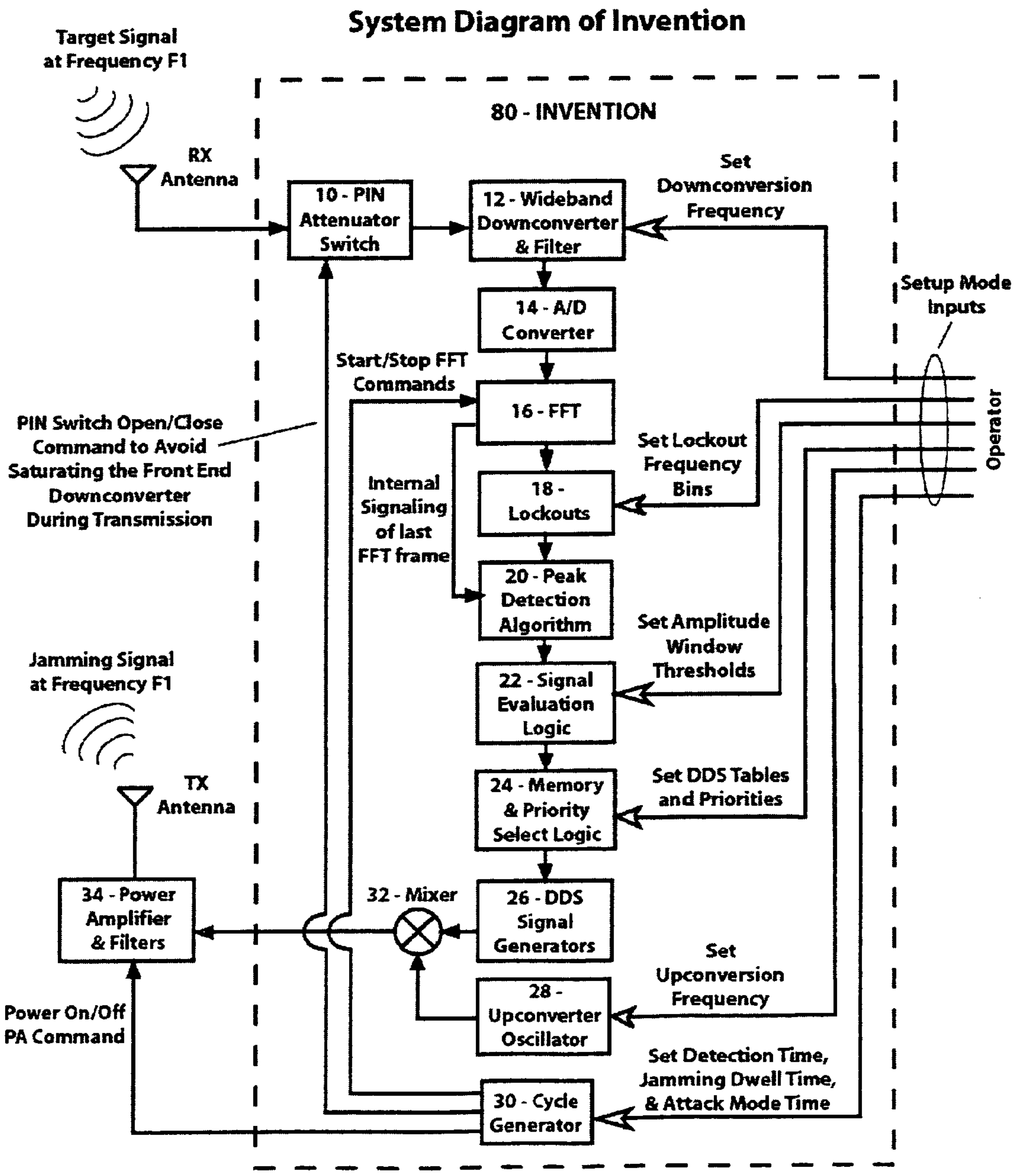
FIG. 4 is a function block diagram of the invention of this patent application. The invention is comprised of several sections.

FIG. 4 outlines a block diagram of the invention. The first section is an array of three antennas that are used to provide signals with phase differences to the DF algorithm. The next section is composed of three data channels, one to handle the input from each antenna. These channels are identical in hardware and software implementation. Each channel is described in more detail in the parent application of this disclosure, application Ser. No. 10/912,976; said disclosure being incorporated herein by reference.

The System then has a logic section to automatically make a determination as to whether the signal should be jammed or not. This logic section contains a Direction-finding ("DF") algorithm to calculate the direction of the received signals. Then, the System has a section to automatically generate the correct transmission frequency. All of this is done in near real time, with no human intervention.

The present invention is implemented in hardware and controlled by software programming. The invention adds real time DF capabilities to the previous patent application's invention (Ser. No. 10/912,976), and thus replicates the front half of the previous invention's hardware into three separate data channels. Each data channel starts with one receiving antenna out of an array of three or more antennas, the array providing direction-finding capability.

The next section of the invention recombines the front half's three data channels into one data channel. There the real time DF algorithm is employed. This next section contains the selection logic that automatically determines whether or not the received signal should be jammed. The part of the logic section most important to present invention is the DF algorithm that calculates the direction to the received signals in real time.

The cycle generator section regulates the user-configurable System timing and microsecond automatic triggering. The final section of the invention executes the jamming frequency generation and output. All of the processing that occurs in each section runs in near real time, fast enough to react to very fast frequency-hopping transmitters.

DIAGRAM REFERENCE NUMERALS

10, 11, 12 PIN Diode Attenuator Switches
14, 15, 16 Wideband Downconverters and Filters
18, 19, 20 Analog-to-Digital Converters (A/D)
22, 23, 24 Fast Fourier Transformations (FFT's)
26 DF Algorithm
28 Lockout Logic
30 Peak Detection Algorithm
32 Signal Evaluation Algorithm
34 Memory and Priority Select Logic
36 Direct Digital Synthesizers (DDS's)
38 Upconverter Oscillator
40 Cycle Generator
42 Mixer
44 High Power Amplifier (PA) and Output Filter
80 System of the present invention

Operation

As discussed above, the present invention adds real time DF capabilities to the previously-disclosed near-real-time surgical jammer. To add DF capabilities, an array of three receiving antennas is used. PIN diodes 10, 11, and 12 and converter devices 14, 15, and 16 are connected, one to each antenna, to down-convert the received signals. As described above, some of the hardware of the previous (single-antennae) design is replicated to process input from three antennas in parallel (instead of only one antenna).

The operation of the data channels from the down-converters 14, 15, and 16 through the FFT devices 22, 23, and 24 is identical to the design of the device of the parent application, just replicated into three data channels instead of one.

All of the information from the three bin arrays from the three FFT hardware devices is then fed to another hardware logic component 26 (such as an FPGA) that performs a Watson-Watt direction finding (DF) algorithm. Because the three receiving antennas are in slightly separate locations, the data in each of the three bin arrays is slightly phase-shifted from each other. The DF algorithm uses these slight differences between the three corresponding bins from each of the three FFT frame arrays to determine the signal direction for each individual frequency bin. A digital Watson-Watt algorithm is used to calculate the direction from a comparison of the phase and amplitude in each bin.

The hardware logic component 26 then compares the signal direction for each bin with the directional sectors of interest that had been provided during the System preprogramming phase when the system was in Setup Mode. Logic component 26 then excludes those bins whose compass directions (relative to the jamming platform) lie outside of the sectors of interest, and passes only those bins within the sectors of interest to lockouts logic component 28 (which "locks out" those sectors that are outside the sectors of interest).

Again, the operation of the system from the lockouts logic component 28 through the transmission of the final jamming frequency is exactly the same as described by the parent application to this application.

Operation Modes

As described by the parent application, this invention has two major operational modes, the Setup Mode, and the Attack Loop Mode. The change that this invention adds to the Modes is to add an additional parameter to be set in the Setup Mode.

The additional Setup Mode parameter is the specification of the compass sectors to be jammed. For ease of use, the system operator is given a circular compass software display to indicate the (possibly multiple) directions or sectors of interest (i.e. where the enemy is believed to be located). The operator uses the compass display to sweep out the sector, or sectors, to be monitored and jammed. All other Setup Mode parameters stay the same as described by the parent application.

After all these parameters are set, the operator then commands the system into the Attack Loop Mode. In this mode, the system simply monitors the RF spectrum that it was assigned to. If any short-duration frequency-hopping signals are detected within that range, the system will automatically send out a jamming signal in near real time. As mentioned, the operation continues for a user programmable period of time (attack time), or until the operator manually cancels the Attack Loop Mode and brings the System back into the Setup Mode.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A directional electronic signal jamming system, comprising:

a wideband signal collection front end, comprising:

a wideband receiver for receiving RF signals transmitted by an RF signal transmitter across a broad spectrum said receiver comprising first, second and third antennae means for receiving RF signals simultaneously, said antennae means in geographically spaced relation;

a digitizer for creating an individual continuous stream of digitized data representing each said antennae means' received RF signals;

a digital data conversion means for converting said individual digitized data stream into FFT frequency bins by individual stream;

direction determination means for determining a direction from said antennae means to said RF transmitter;

directional lockout means responsive to said direction determination means for selectively enabling jamming signal transmissions against said RF transmitter only if said direction to said RF transmitter from said antennae means is within a bearing sector of interest;

a signal evaluation logic module, comprising:

a comparing means for comparing each said frequency bin to configurable preset lockout frequency bins;

a peak detection means for evaluating and calculating the amplitude value for each bin by using a configurable number of data point samples for each of those bins;

a windowing means for evaluating and calculating the amplitude value for each bin by using a configurable number of data point samples for each of those bins; and a priority selection means for evaluating the prioritization of jammer signal targets based upon configurable settings;

an internal transmitter also responsive to said comparing, peak detection, windowing, and priority logic for transmitting a jamming signal on said frequency of interest; and an internal cycle generator timing circuit for the proper high-speed automatic triggering of all modules of the directional electronic signal jamming system.

2. The system of claim 1, wherein said directional lockout means further consolidates said individual frequency bins representing said individual digitized data streams into a single frequency bin.

3. The system of claim 2, wherein said digital data conversion means comprises means for converting said digitized data from a time domain to a frequency domain.

4. The system of claim 3, wherein said digital data conversion means comprises means for converting said frequency domain converted data from separate real and imaginary components to normalized amplitude data.

5. The system of claim 4, wherein said normalized amplitude data is categorized by frequency bins.

6. The system of claim 5, wherein said comparing means comprises comparing data in said frequency bins to frequency lockouts.

7. The system of claim 6, further comprising peak detection means for evaluating the amplitude of said frequency bins.

8. The system of claim 7, wherein said windowing means for evaluating each bin to be within configurable amplitude bound limits.

9. The system of claim 8, further comprising means for comparing said amplitude-evaluated signal to a pre-established signal priority list.

10. The system of claim 9, wherein said signal priority logic means further compares said amplitude-evaluated signal to a real-time priority request.

11. A method for jamming RF signal transmissions, comprising the steps of:

detecting an analog RF signal transmission emanating from a signal transmitter, said detected RF signal transmission first having been received by first, second and third antennae means located in geographically spaced relation to one another;

digitizing said detected RF signal transmission into first, second and third digitized signals;

converting said digitized signals into first, second and third frequency bins;

analyzing phase characteristics of each said digitized signal determining a relative bearing between said antennae means and said signal transmitter responsive to said analyzing;

comparing said frequency bins to configurable lockout frequency bins;

evaluating and calculating the amplitude value for each said bin by using a configurable number of data point samples for each of those bins;

evaluating the prioritization of jammer signal targets based upon configurable settings;

triggering said start of the conversion of said digitized signals into said frequency bins;

triggering the end of the conversion of said digitized signals into said frequency bins;

triggering the release of frequency bin information at the correct time;

triggering of the external power amplifier at the correct time to prepare for jammer signals;

automatic programming of a digital signal generator to generate a jamming signal, said signal generator triggering responsive to said comparing.

12. The method of claim 11, further comprising a bearing transmission lockout step comprising ceasing said jamming method responsive to said analyzing and said determining steps.

13. The method of claim 12, wherein said bearing transmission lockout step ceases said jamming method when said relative bearing is in a locked out bearing sector.

14. The method of claim 13, further comprising an attenuator switching step, responsive to said digital signal generator, wherein an attenuator switch means for shielding the RF receiver system performing said receiving step is actuated.

15. The method of claim 14, further comprising the proper triggering of all internal and external elements of the electronic jamming system.

16. The method of claim 15, further comprising a lockout step prior to said comparing step, said lockout step comprising comparing said converted digitized signals to a dynamic list of lockout frequency bins.

17. The method of claim 16, further comprising a signal threshold-comparing step prior to said comparing step, comprising comparing said frequency bins to signal threshold settings.

18. The method of claim 17, wherein said digital transmitter triggering step is responsive to said signal threshold-comparing step.

* * * * *